United States Patent [19]

Yanagi

[11] Patent Number: 4,759,302
[45] Date of Patent: Jul. 26, 1988

[54] SEWING MACHINE

[75] Inventor: Toshiaki Yanagi, Nagoya, Japan

[73] Assignee: Brother Kogyo Kabushiki Kaisha, Nagoya, Japan

[21] Appl. No.: 929,046

[22] Filed: Nov. 10, 1986

[30] Foreign Application Priority Data

Nov. 20, 1985 [JP] Japan .................. 60-179227[U]

[51] Int. Cl.$^4$ ............................................. D05B 21/00
[52] U.S. Cl. .................. 112/121.12; 112/457
[58] Field of Search ........... 112/121.12, 121.11, 112/453, 457, 445, 275, 277; 364/400, 470

[56] References Cited

U.S. PATENT DOCUMENTS

| | | | |
|---|---|---|---|
| 3,400,677 | 9/1968 | Bowers et al. | 112/275 |
| 4,051,794 | 10/1977 | Herzer et al. | 112/121.12 |
| 4,055,131 | 10/1977 | O'Brien et al. | 112/445 |
| 4,154,178 | 5/1979 | Brown et al. | 112/457 |
| 4,160,422 | 7/1979 | Barber et al. | 112/121.11 |
| 4,203,378 | 5/1980 | Giesselmann et al. | 112/457 |
| 4,258,636 | 3/1981 | Rolauffs et al. | 112/121.12 |

FOREIGN PATENT DOCUMENTS

| | | |
|---|---|---|
| 0085282 | 10/1983 | European Pat. Off. . |
| 0121147 | 10/1984 | European Pat. Off. . |
| 0148281 | 7/1985 | European Pat. Off. . |
| 2072101 | 9/1981 | United Kingdom . |
| 2133581 | 7/1984 | United Kingdom . |

*Primary Examiner*—Peter Nerbun
*Attorney, Agent, or Firm*—Jordan and Hamburg

[57] ABSTRACT

Multiple sewing data which are required for a sewing operation based on a desired pattern and are prepared by a programming device are stored in a card equipped with an integrated circuit capable of reading and writing such data. A stitch forming device and a work fabric feeding device are actuated on the basis of the data, thereby forming stitches on a work fabric.

6 Claims, 2 Drawing Sheets

SEWING MACHINE

BACKGROUND OF THE INVENTION

1. Field of the Invention:

The present invention relates to a sewing machine having a memory capable of storing sewing data.

2. Description of the Prior Art:

This type of a prior art sewing machine is equipped with multiple storage media as a means for storing data required for performing a sewing operation based on a predetermined sewing pattern. For instance, the sewing machine which was disclosed in U.S. Pat. No. 4,051,794 is provided with a programable read only memory (P.ROM) defined as the above-described storage means. The P.ROM is, however, attended with such a problem that this memory is not invested with high durability against an impact or static electricity and it therefore needs a particular protective package, this leading to an increase in cost of production.

The sewing machines which were disclosed in U.S. Pat. No. 4,160,422 and 4,258,636 are respectively include, as a storage means, non-volatile replaceable memory media such as a cassette tape, a floppy disc or the like. There arise, however, such problems inherent in these sewing machines that appropriate devices such as a cassette recorder, a floppy disc drive unit or the like are required for erasing the sewing data and writing them, this conducing to not only a rise in the production cost but also redundancy of time to process the above-mentioned data because of inconvenience of treatment thereof.

SUMMARY OF THE INVENTION

Accordingly, it is a primary object of the present invention to provide an easily treatable sewing machine which does not need particular devices both for reading the data and for writing them and can be manufactured at a relatively low cost.

To this end, according to one aspect of the invention, there is provided a sewing machine including a storage means which is so connected to a control means thereof as to be separatable from the outside, this storage means being composed by a card equipped with an integrated circuit capable of reading and writing the sewing data.

BRIEF DESCRIPTION OF THE DRAWINGS

FIG. 1 is a perspective view of a sewing machine;

FIG. 2 is a block diagram showing an electrical constitution of the sewing machine; and FIG. 3 is an explanatory view of sewing data for one stitch.

DETAILED DESCRIPTION OF THE PREFERRED EMBODIMENT

Figure 1:
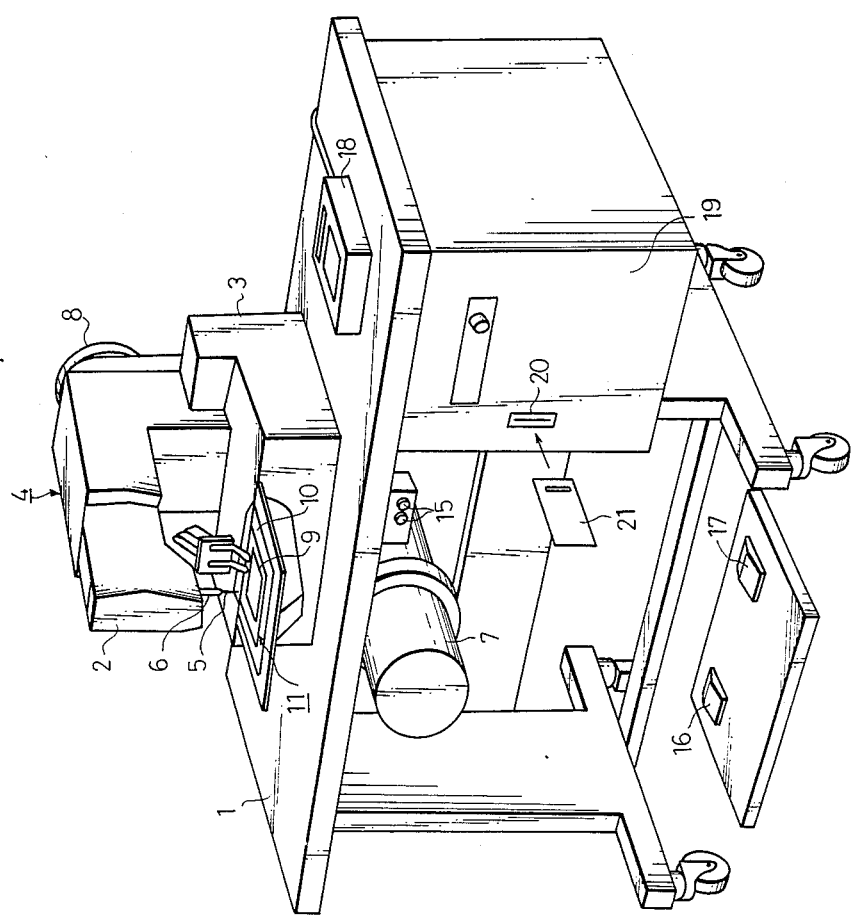
FIGS. 1 to 3 in combination show one embodiment of the present invention.

One embodiment of the present invention will hereinafter be described with reference to the accompanying drawings. It can be observed through FIG. 1 that a machine frame 4 consisting of an arm 2 and a bed 3 is disposed on the upper surface of a table 1. A needle bar 6 including a needle 5 is so fitted to the lower end of the arm 2 as vertically movable, which vertical motion is made concomitantly with rotation of a main shaft (not illustrated) of the sewing machine. The needle 5 and a loop taker (not illustrated) provided within the bed 3 constitute a stitch forming device. The needle 5 and the loop taker are so operated as to be concomitant with the rotation of the main shaft of the sewing machine, thereby forming stitches on a work fabric.

To the lower surface of the table 1 is attached a motor 7 for rotationally driving the above-mentioned main shaft; and this rotation of the motor is transmitted to the main shaft through a well known rotation transmitting mechanism which includes a driven pulley 8 provided at the end of the main shaft. A first driving means is composed by this motor 7.

Figure 2:
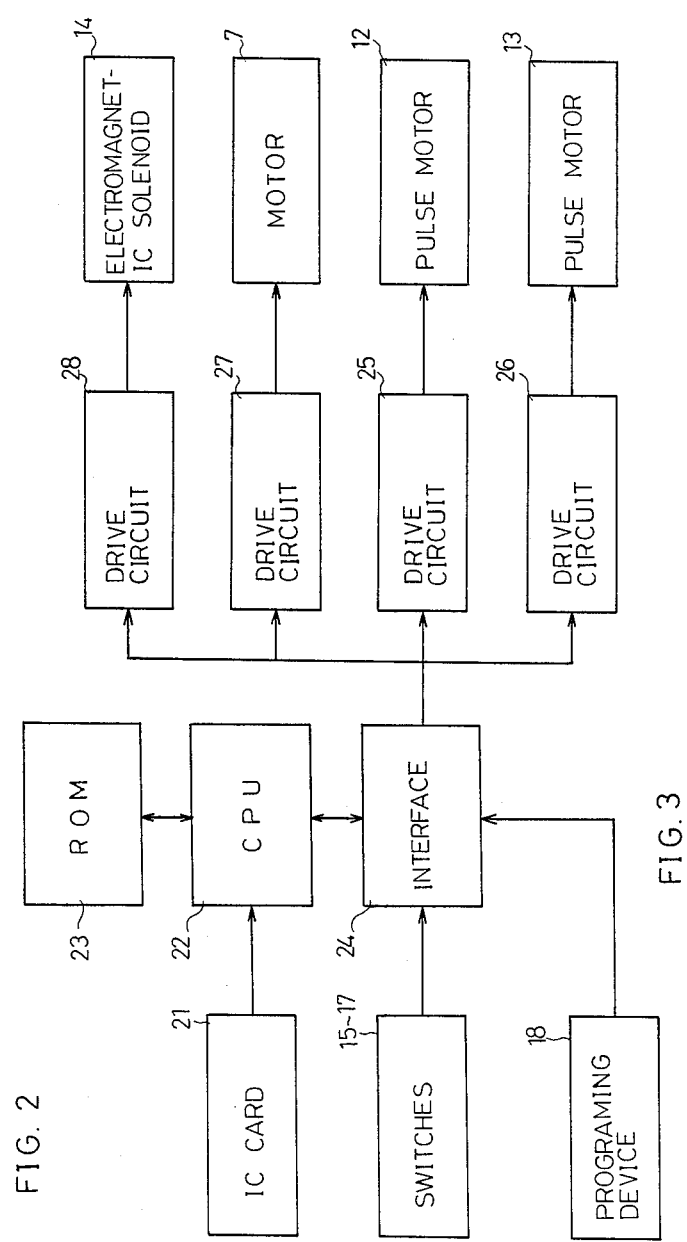

A holding device 11 composed by a material holding frame 9 and a material supporting pallet 10 is disposed on a work fabric supporting surface in front of the bed 3. The holding device 11 is moved in the back and forth direction as well as in the lateral direction by a pair of pulse motors 12, 13 which are shown in FIG. 2 while the work fabric is held between the material supporting pallet 10 and the material holding frame 9, thus feeding the work fabric. It is to be remarked that a second driving means is constituted by the pulse motors 12, 13. The material holding frame 9 is vertically moved through actuation of a material holding frame operating electromagnetic solenoid 14 illustrated in FIG. 2. The material holding frame 9 is raised to the ascent position, in which state the work fabric is arranged to be set between the material holding frame 9 and the material supporting pallet 10.

As shown in FIG. 1, an ON-OFF switch 15 for inputting a power source to the sewing machine is provided on the front lower surface of the table 1, and at the lower portion thereof are provided: an actuating switch 16 which is manipulated by depressing for actuating the electromagnetic solenoid 14; and a starting switch 17 which is manipulated by depressing for starting the sewing machine.

On the right side upper surface of the table 1, there is disposed a programing device 18 for preparing the sewing data including driving data used for the motor 7 and operating data for the pulse motors 12, 13 which are required for effecting the sewing operation on the basis of a desired sewing pattern. A control box 19 is mounted on the right lower surface of the table 1; and on the front surface thereof is provided a card inserting slot 20. An integrated circuit card 21 having a thin plate-like configuration, which stores the sewing data such as to be capable of reading and writing the same data, is attachably and detachably installed in the card inserting slot 20. This integrated circuit card is formed of plastic and includes an IC (integrated circuit) which is embedded therein. The integrated circuit card 21 employed in this embodiment involves "MELCARD" (Brand Name) made by Mitsubishi Electric Corp. The integrated circuit of the integrated circuit card is constituted by a RAM and a battery.

In this embodiment, as illustrated in FIG. 2, a central processing unit (CPU) 22 serving as the control means is built in the control box 19, to which CPU 22 is connected a read only memory (ROM) 23. A program intended to control the actuation of the sewing machine as a whole is stored in this ROM 23. In the case of preparing the sewing data, the integrated circuit card 21 is installed in the card inserting slot 20 from outside, and simultaneously a recording paper in which the configuration of desired sewing pattern is drawn beforehand is held by the holding device 11. The holding device is moved so that the sewing pattern goes along needle dropping positions. Videlicet, in order that the needle 5 makes a relative movement with respect to the holding device 11 along the above-described sewing pattern, a predetermined key (ex. jog key) of the programing device 18 is manipulated. This predetermined key or programing device 18 is disclosed in U.S. Pats. No. 4,444,135, No. 4,403,559 and No. 4,385,570. Upon an input of a predetemined signal from the programing device 18 via an interface 24 to the CPU 22, the CPU 22 actuates the respective pulse motors 12, 13 by way of drive circuits 25, 26 in response to the signal, thereby moving the holding device 11.

Figure 3:
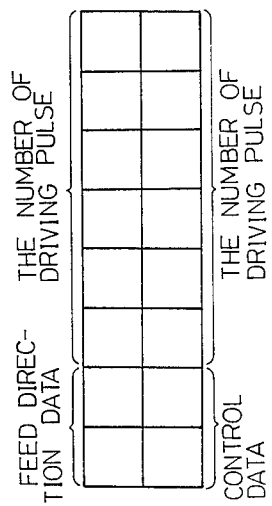

On the basis of this programing operation, the CPU 22 writes the sewing data in the integrated circuit card 21 for every stitch, the sewing data including the operation data for the pulse motors 12, 13 and the control data for the sewing machine motor 7. The sewing data for one stitch is, as shown in FIG. 3, constituted by 2 bites. Of the sewing data 2 bits are allocated to the control data (sewing machine information on a stop, a low speed operation, a high speed operation and a termination of the pattern and so on) for the sewing machine motor; and to the operation data for the pulse motors 12, 13 are allocated 14 bits. 2 bits of the 14 bits are defined as the data in regard to the rotational direction of the pulse motors 12, 13, viz., the feeding direction data of the holding device 11, and the rest (12 bits) thereof are the data on the number of driving pulses of the pulse motors 12, 13.

When performing the sewing operation on the basis of the sewing data prepared by the above-mentioned programing operation, at the first onset, the ON-OFF switch 15 is manipulated in order to input the power source to the sewing machine. The integrated circuit card 21 is installed in the card installing portion 21 to be electrically connected to the CPU 22. In the wake of this, immediately when manipulating the actuating switch 16, the CPU 22 energizes the electromagnetic solenoid 14 through the interface 24 and a drive circuit 28, and then arranges for the material holding frame 11 to be raised with the help of the electromagnetic solenoid 14.

In such a state, the work fabric is set between the material holding frame 9 and the material supporting pallet 10. Thereafter, upon an operation of the starting switch 17, starting signals are inputted to the CPU 22. In response to these signals, the CPU 22 deenergizes the electromagnetic solenoid 14 to lower the material holding. frame 11, and then reads the sewing data from the integrated circuit card 21; and the sewing machine motor 7 and each of the pulse motors 12, 13 are driven in accordance with such data. With the motor 7 driven, the needle 5 penetrates the work fabric disposed on the work fabric supporting surface and keeps on moving vertically. Concurrently, the loop taker is actuated, and the work fabric is fed through the actuation of the individual pulse motors 12, 13. With such steps, it is feasible to form stitches on the work fabric on the basis of the sewing pattern recorded in the recording paper.

In this embodiment, after the sewing operation has been completed, the integrated circuit card 21 is removed from the card inserting slot 20 and can be preserved in a state wherein the card 21 stores the sewing data. In such a case, the integrated circuit card 21 takes the thin plate-like shape and hence it is easy of treatment. Moreover, a space for preservation can be reduced. In this embodiment, the sewing data are read or written from the integrated circuit card 21 and a particular device is therefore unnecessary. In addition, it is most unlikely that preparation of the storage means does not create any obstacle against an offer of a low-priced sewing machine.

As many apparently widely different embodiments of this invention may be made without departing from the spirit and scope thereof, it is to be understood that the invention is not limited to the specific embodiments thereof except as defined in the appended claims.

What is claimed is:

1. In a sewing machine having:
   stitch forming means including a needle adapted to reciprocate with respect to a material on a material supporting surface;
   first driving means for driving said stitch forming means;
   material holding means for holding the material on the material supporting surface;
   second driving means for causing relative movement between said stitch forming means and material holding means;
   storage means for storing necessary sewing data;
   control means for controlling said first driving means and said second driving means in accordance with said sewing data stored in said storage means; the improvement wherein said storage means consists of an IC card which comprises a thin plastic card, an integrated circuit read-write memory for said sewing data and a battery embedded in said thin plastic card, said battery maintaining data in said memory, and further comprising means for detachably connecting said card to said control means from externally of said sewing machine through a card inserting slot of a control box of said sewing machine.

2. In a sewing machine having:
   stitch forming means including a reciprocating needle adapted to reciprocate with respect to a material on a material supporting surface;
   first driving means for driving said stitch forming means;
   material holding means for holding the material on the material supporting surface;
   second driving means for causing relative movement between said stitch forming means and material holding means;
   programming means for providing necessary sewing data;
   storage means for storing the sewing data provided by the programming means;
   control means for controlling said first driving means and said second driving means in accordance with said sewing data stored in said storage means; the improvement wherein said first driving means includes an electric motor for driving a main shaft of said sewing machine;
   said second driving means includes a pair of pulse motors driven by actuating signals transferred from said control means;
   said sewing data includes control data for controlling said electric motor and pulse motors; and
   said storage means consists of an IC card capable of reading and writing sewing data;
   said IC card comprising a thin plastic card, an integrated circuit read-write memory and a battery embedded therein, said battery being connected to maintain data in said memory; and said IC card being connected detachably to said control means from externally of said sewing machine through a card installing slot of a control box of said sewing machine to enable writing of data thereon by said programming means.

3. A sewing machine according to claim 2, wherein said first driving means includes an electric motor for driving a main shaft of said sewing machine.

4. A sewing machine according to claim 2, wherein said second driving means includes a pair of pulse motors driven by actuating signals transferred from said control means.

5. A sewing machine according to claim 2, wherein said material holding means includes a material supporting pallet and a material holding frame for supporting and holding the material respectively, said material being held therebetween.

6. A sewing machine according to claim 5, wherein said material holding frame is adapted to be vertically moved in accordance with actuation of an electromagnetic solenoid.

* * * * *